United States Patent
Jang et al.

(10) Patent No.: US 10,269,347 B2
(45) Date of Patent: Apr. 23, 2019

(54) METHOD FOR DETECTING VOICE AND ELECTRONIC DEVICE USING THE SAME

(71) Applicant: SAMSUNG ELECTRONICS CO., LTD., Suwon-si, Gyeonggi-do (KR)

(72) Inventors: Sungwoon Jang, Hwaseong-si (KR); Sangwook Shin, Seoul (KR); Sungwan Youn, Seoul (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 157 days.

(21) Appl. No.: 15/423,840

(22) Filed: Feb. 3, 2017

(65) Prior Publication Data
US 2017/0229119 A1 Aug. 10, 2017

(30) Foreign Application Priority Data
Feb. 5, 2016 (KR) .......................... 10-2016-0014956

(51) Int. Cl.
*G10L 15/00* (2013.01)
*G10L 15/22* (2006.01)
(Continued)

(52) U.S. Cl.
CPC .............. *G10L 15/22* (2013.01); *G10L 15/08* (2013.01); *G10L 21/0208* (2013.01);
(Continued)

(58) Field of Classification Search
None
See application file for complete search history.

(56) References Cited

U.S. PATENT DOCUMENTS 8,719,014 B2 * 5/2014 Wagner ................. G06F 17/273
704/1
9,620,104 B2 * 4/2017 Naik ....................... G10L 13/027
(Continued)

FOREIGN PATENT DOCUMENTS

| JP | 2012-208218 | 10/2012 |
| KR | 1998-0039558 | 8/1998 |

(Continued)

*Primary Examiner* — Marcus T Riley
(74) *Attorney, Agent, or Firm* — Nixon & Vanderhye P.C.

(57) ABSTRACT

An electronic device is provided, which includes a housing; a microphone located on or within a predetermined distance of a first portion of the housing; a speaker located on or within a predetermined distance of a second portion of the housing; a communication circuit; a processor electrically connected to the microphone, the speaker, and the communication circuit; and a memory electrically connected to the processor configured to store a message to be provided as a voice through the speaker, wherein the memory stores instructions, wherein the processor is configured to execute the instructions to perform operations comprising: determining time information corresponding to a first part of the message if providing of the message is necessary, outputting the message through the speaker, receiving an input sound through the microphone while at least a part of the message is output, and processing the input sound using the time information to detect at least one word or sentence from the input sound, and the processing the input sound includes processing the input sound by ignoring at least a part of the input sound using the time information.

19 Claims, 11 Drawing Sheets

(51) Int. Cl.
  G10L 15/08 (2006.01)
  G10L 21/0208 (2013.01)
  G10L 25/78 (2013.01)
(52) U.S. Cl.
  CPC ........ G10L 25/78 (2013.01); *G10L 2015/088* (2013.01); *G10L 2015/223* (2013.01)

(56) References Cited

U.S. PATENT DOCUMENTS

| | | | |
|---|---|---|---|
| 9,697,822 B1* | 7/2017 | Naik | G10L 15/063 |
| 9,711,141 B2* | 7/2017 | Henton | G10L 15/22 |
| 9,922,642 B2* | 3/2018 | Pitschel | G10L 15/063 |
| 9,966,068 B2* | 5/2018 | Cash | G10L 15/22 |
| 2008/0104702 A1 | 5/2008 | Choi et al. | |
| 2011/0051950 A1* | 3/2011 | Burnett | G10L 21/0208 381/92 |
| 2011/0051951 A1* | 3/2011 | Burnett | G10L 21/0208 381/92 |
| 2013/0226850 A1* | 8/2013 | Hannuksela | G10L 25/48 706/14 |
| 2014/0278419 A1* | 9/2014 | Bishop | G06F 3/16 704/249 |
| 2015/0081296 A1* | 3/2015 | Lee | G10L 15/20 704/239 |
| 2016/0300566 A1* | 10/2016 | Hofer | G10L 15/08 |
| 2016/0316293 A1* | 10/2016 | Klimanis | H04L 12/2823 |
| 2017/0229119 A1* | 8/2017 | Jang | G10L 15/22 |

FOREIGN PATENT DOCUMENTS

| | | |
|---|---|---|
| KR | 1999-0033068 | 5/1999 |
| KR | 2002-0045960 | 6/2002 |
| KR | 10-2006-0095346 | 8/2006 |
| KR | 10-0862187 | 10/2008 |
| KR | 10-1298740 | 8/2013 |
| KR | 10-1368464 | 2/2014 |
| KR | 10-2015-0087025 | 7/2015 |

* cited by examiner

METHOD FOR DETECTING VOICE AND ELECTRONIC DEVICE USING THE SAME

CROSS-REFERENCE TO RELATED APPLICATION

The present application is based on and claims priority under 35 U.S.C. § 119 to Korean Patent Application No. 10-2016-0014956, filed on Feb. 5, 2016 in the Korean Intellectual Property Office, the disclosure of which is incorporated by reference herein in its entirety.

BACKGROUND

Field

The present disclosure relates generally to a method for detecting a voice and an electronic device using the same.

Description of Related Art

A user of an electronic device can activate or trigger the electronic device that includes a portable terminal through voice detection (or voice wakeup). The electronic device can execute a specific function through detection of user's voice. In general, voice detection may be implemented in the form of keyword detection for detecting a specific word spoken by the user.

It is general that keyword detection is performed using a pattern matching technology that extracts features from a voice that is input to a microphone of an electronic device and matches the extracted features with a pre-generated model of a keyword to be detected. In this case, if an ambient noise or an echo on an output end is included in the voice that is input to the microphone, the keyword detection performance may deteriorate. In particular, in the case where a specific sound source (e.g., music, Text To Speech (TTS), or Automatic Response Service (ARS)) is reproduced in an electronic device that performs the voice detection, the specific sound source may barge into the microphone of the device (e.g., echo or the like) to cause malfunction of the keyword detection. For example, if a user speaks a specific keyword while an echo is generated, the keyword spoken by the user and the echo may be mixed with each other to cause the keyword detection performance to deteriorate.

SUMMARY

Various example embodiments of the present disclosure can prevent and/or reduce the keyword detection performance from deteriorating without distorting a keyword spoken by a user in the case where the keyword to be detected is included in a certain sound source that is reproduced in an electronic device.

According to various example embodiments of the present disclosure, an electronic device includes a housing; a microphone located on within a predetermined distance of a first portion of the housing; a speaker located on or within a predetermined distance of a second portion of the housing; a communication circuit; a processor electrically connected to the microphone, the speaker, and the communication circuit; and a memory electrically connected to the processor to store a message to be provided as a voice through the speaker, wherein the memory, stores instructions, the processor being configured to execute the instructions stored in the memory to perform operations comprising: determining time information corresponding to a first part of the message if providing of the message is necessary; outputting the message through the speaker; receiving an input sound through the microphone while at least a part of the message is output, and processing the input sound using the time information to detect at least one word or sentence from the input sound, and processing the input sound by ignoring at least a part of the input sound using the time information.

According to various example embodiments of the present disclosure, a method for processing an input sound of an electronic device includes at least temporarily storing a message to be provided as a voice through a speaker; determining time information corresponding to a first part of the message if providing of the message is necessary; outputting the message through the speaker; receiving an input sound through a microphone while at least a part of the message is output; and processing the input sound using the time information to detect at least one word or sentence from the input sound, wherein the processing the input sound includes processing the input sound by ignoring at least a part of the input sound using the time information.

According to the various example embodiments of the present disclosure, in the case where a specific sound source (e.g., music, TTS, or ARS) is reproduced through an output end (e.g., speaker) of the electronic device that provides the voice detection function, malfunction of the keyword detection can be prevented and/or reduced. For example, in the case where the keyword to be detected is included in the specific sound source that is reproduced through the output end, the keyword detection performance can be improved without distorting a keyword spoken by a user.

BRIEF DESCRIPTION OF THE DRAWINGS

The above and other aspects, features and attendant advantages of the present disclosure may be more readily appreciated and understood from the following detailed description, taken in conjunction with the accompanying drawings, in which like reference numerals refer to like elements, and wherein.

DETAILED DESCRIPTION

Figure 1:
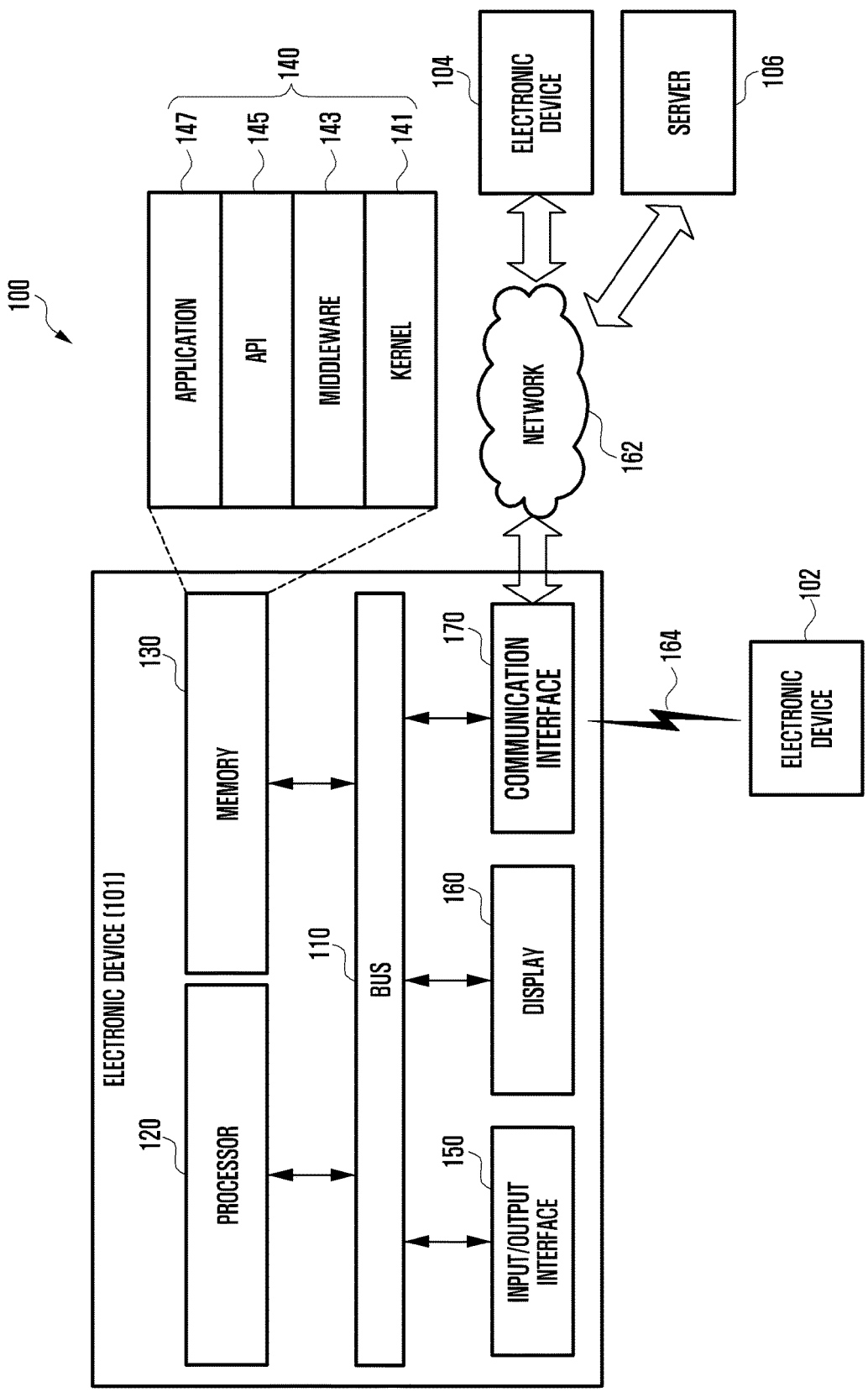
FIG. 1 is a diagram illustrating an example network environment including an electronic device according to various example embodiments of the present disclosure.

Hereinafter, example embodiments of the present disclosure are described in greater detail with reference to the accompanying drawings. While the present disclosure may be embodied in many different forms, specific embodiments of the present disclosure are illustrated in drawings and are described herein in detail, with the understanding that the present disclosure is to be considered as an example of the principles of the disclosure and is not intended to limit the disclosure to the various embodiments illustrated. The same reference numbers are used throughout the drawings to refer to the same or like parts.

An expression "comprising" or "may comprise" used in the present disclosure indicates presence of a corresponding function, operation, or element and does not limit additional at least one function, operation, or element. Further, in the present disclosure, a term "comprise" or "have" indicates presence of a characteristic, numeral, step, operation, element, component, or combination thereof described in a specification and does not exclude presence or addition of at least one other characteristic, numeral, step, operation, element, component, or combination thereof.

In the present disclosure, an expression "or" includes any combination or the entire combination of together listed words. For example, "A or B" may include A, B, or A and B.

An expression of a first and a second in the present disclosure may represent various elements of the present disclosure, but do not limit corresponding elements. For example, the expression does not limit order and/or importance of corresponding elements. The expression may be used for distinguishing one element from another element. For example, both a first user device and a second user device are user devices and represent different user devices. For example, a first constituent element may be referred to as a second constituent element without deviating from the scope of the present disclosure, and similarly, a second constituent element may be referred to as a first constituent element.

When it is described that an element is "coupled" to another element, the element may be "directly coupled" to the other element or "electrically coupled" to the other element through a third element. However, when it is described that an element is "directly coupled" to another element, no element may exist between the element and the other element.

Terms used in the present disclosure are not to limit the present disclosure but to illustrate example embodiments. When using in a description of the present disclosure and the appended claims, a singular form includes a plurality of forms unless it is explicitly differently represented.

Unless differently defined, entire terms including a technical term and a scientific term used here have the same meaning as a meaning that may be generally understood by a person of common skill in the art. It should be understood that generally using terms defined in a dictionary have a meaning corresponding to that of a context of related technology and are not interpreted to have an ideal or excessively formal meaning unless explicitly defined.

In this disclosure, an electronic device may be a device that involves a communication function. For example, an electronic device may be a smart phone, a tablet PC (Personal Computer), a mobile phone, a video phone, an e-book reader, a desktop PC, a laptop PC, a netbook computer, a PDA (Personal Digital Assistant), a PMP (Portable Multimedia Player), an MP3 player, a portable medical device, a digital camera, or a wearable device (e.g., an HMD (Head-Mounted Device) such as electronic glasses, electronic clothes, an electronic bracelet, an electronic necklace, an electronic appcessory, or a smart watch), or the like, but is not limited thereto.

According to some embodiments, an electronic device may be a smart home appliance that involves a communication function. For example, an electronic device may be a TV, a DVD (Digital Video Disk) player, audio equipment, a refrigerator, an air conditioner, a vacuum cleaner, an oven, a microwave, a washing machine, an air cleaner, a set-top box, a TV box (e.g., Samsung HomeSync™, Apple TV™, Google TV™, etc.), a game console, an electronic dictionary, an electronic key, a camcorder, or an electronic picture frame, or the like, but is not limited thereto.

According to some embodiments, an electronic device may be a medical device (e.g., MRA (Magnetic Resonance Angiography), MRI (Magnetic Resonance Imaging), CT (Computed Tomography), ultrasonography, etc.), a navigation device, a GPS (Global Positioning System) receiver, an EDR (Event Data Recorder), an FDR (Flight Data Recorder), a car infotainment device, electronic equipment for ship (e.g., a marine navigation system, a gyrocompass, etc.), avionics, security equipment, or an industrial or home robot, or the like, but is not limited thereto.

According to some embodiments, an electronic device may be furniture or part of a building or construction having a communication function, an electronic board, an electronic signature receiving device, a projector, or various measuring instruments (e.g., a water meter, an electric meter, a gas meter, a wave meter, etc.), or the like, but is not limited thereto. An electronic device disclosed herein may be one of the above-mentioned devices or any combination thereof. As well understood by those skilled in the art, the above-mentioned electronic devices are examples only and not to be considered as a limitation of this disclosure.

FIG. 1 is a block diagram illustrating an example electronic apparatus in a network environment 100 according to an example embodiment of the present disclosure.

Referring to FIG. 1, the electronic apparatus 101 may include a bus 110, a processor (e.g., including processing circuitry) 120, a memory 130, an input/output interface (e.g., including input/output circuitry) 150, a display 160, and a communication interface (e.g., including communication circuitry) 170.

The bus 110 may be a circuit for interconnecting elements described above and for allowing a communication, e.g. by transferring a control message, between the elements described above.

The processor 120 may include various processing circuitry and can receive commands from the above-mentioned other elements, e.g. the memory 130, the user input module 150, the display 160, and the communication interface 170, through, for example, the bus 110, can decipher the received commands, and perform operations and/or data processing according to the deciphered commands.

The memory 130 can store commands received from the processor 120 and/or other elements, e.g. the user input module 150, the display 160, and the communication interface 170, and/or commands and/or data generated by the processor 120 and/or other elements. The memory 130 may include software and/or programs 140, such as a kernel 141, middleware 143, an Application Programming Interface (API) 145, and an application 147. Each of the programming modules described above may be configured by software, firmware, hardware, and/or combinations of two or more thereof.

The kernel 141 can control and/or manage system resources, e.g. the bus 110, the processor 120 or the memory 130, used for execution of operations and/or functions implemented in other programming modules, such as the middleware 143, the API 145, and/or the application 147. Further, the kernel 141 can provide an interface through which the middleware 143, the API 145, and/or the application 147 can access and then control and/or manage an individual element of the electronic apparatus 100.

The middleware 143 can perform a relay function which allows the API 145 and/or the application 147 to communicate with and exchange data with the kernel 141. Further, in relation to operation requests received from at least one of an application 147, the middleware 143 can perform load balancing in relation to the operation requests by, for example, giving a priority in using a system resource, e.g. the bus 110, the processor 120, and/or the memory 130, of the electronic apparatus 100 to at least one application from among the at least one of the application 147.

The API 145 is an interface through which the application 147 can control a function provided by the kernel 141 and/or the middleware 143, and may include, for example, at least one interface or function for file control, window control, image processing, and/or character control.

The input/output interface 150 may include various input/output circuitry and can receive, for example, a command and/or data from a user, and transfer the received command and/or data to the processor 120 and/or the memory 130 through the bus 110. The display 160 can display an image, a video, and/or data to a user.

The communication interface 170 may include various communication circuitry and can establish a communication between the electronic apparatus 100 and another electronic devices 102 and 104 and/or a server 106. The communication interface 170 can support short range communication 164 with an electronic device 102 using various short range communication protocols, e.g. a Wireless Fidelity (WiFi) protocol, a BlueTooth (BT) protocol, and a Near Field Communication (NFC) protocol, communication networks, e.g. Internet, Local Area Network (LAN), Wire Area Network (WAN), a telecommunication network, a cellular network, and a satellite network, or a Plain Old Telephone Service (POTS), or any other similar and/or suitable communication networks, such as network 162, or the like. Each of the electronic devices 102 and 104 may be a same type and/or different types of electronic apparatus.

Figure 2:
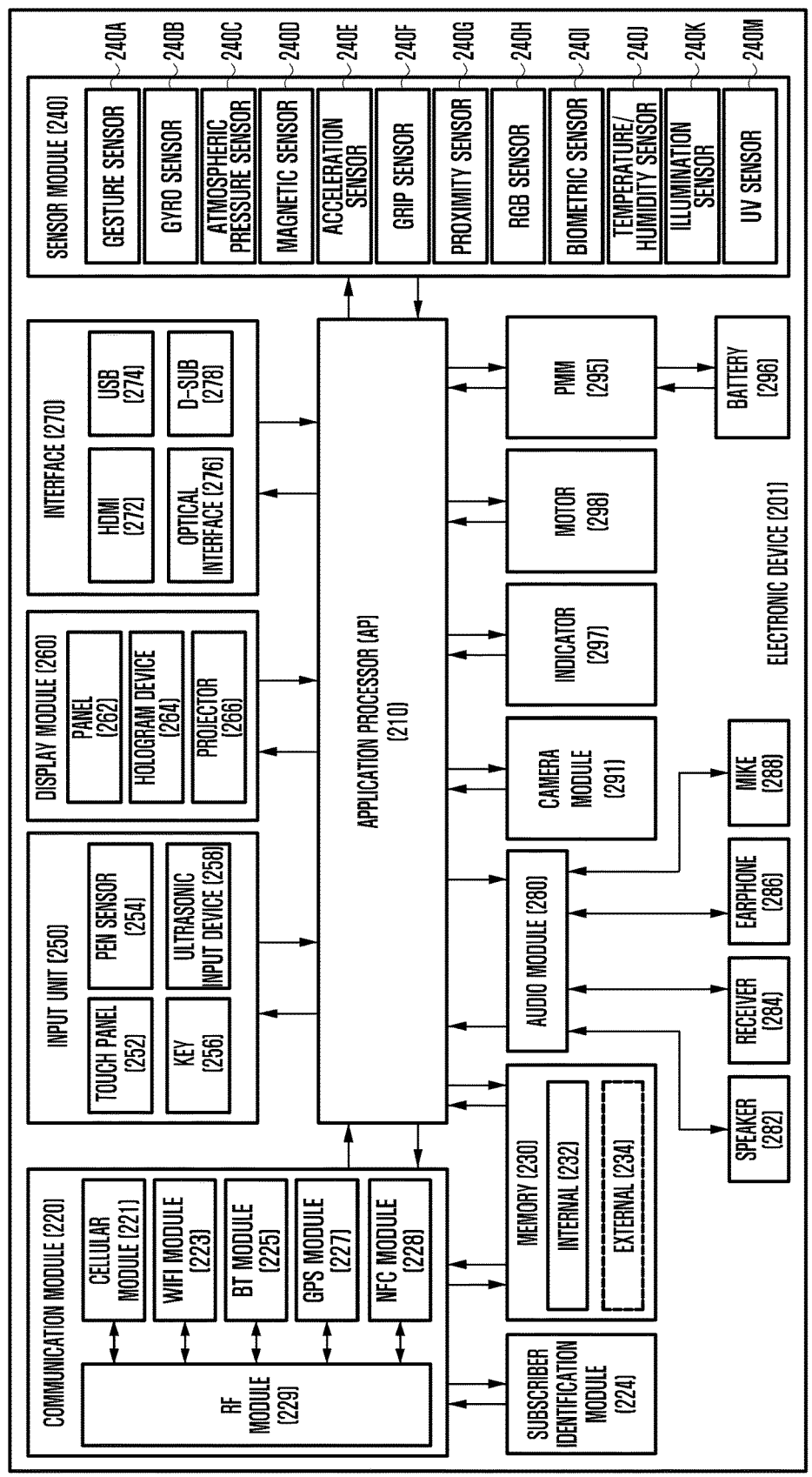
FIG. 2 is a block diagram illustrating an example electronic device according to various example embodiments of the present disclosure.

FIG. 2 is a block diagram illustrating an example electronic device 201 in accordance with an example embodiment of the present disclosure. The electronic device 201 may form, for example, the whole or part of the electronic device 101 shown in FIG. 1. Referring to FIG. 2, the electronic device 201 may include at least one application processor (AP) (e.g., including processing circuitry) 210, a communication module (e.g., including communication circuitry) 220, a subscriber identification module (SIM) card 224, a memory 230, a sensor module 240, an input unit (e.g., including input circuitry) 250, a display 260, an interface (e.g., including interface circuitry) 270, an audio module 280, a camera module 291, a power management module 295, a battery 296, an indicator 297, and a motor 298.

The AP 210 may drive an operating system or applications, control a plurality of hardware or software components connected thereto, and also perform processing and operation for various data including multimedia data. The AP 210 may be formed of system-on-chip (SoC), for example. According to an embodiment, the AP 210 may further include a graphic processing unit (GPU) (not shown).

The communication module 220 (e.g., the communication interface 160) may perform a data communication with any other electronic device (e.g., the electronic device 104 or the server 106) connected to the electronic device 200 (e.g., the electronic device 101) through the network. According to an embodiment, the communication module 220 may include various communication circuitry, such as, for example, and without limitation, a cellular module 221, a WiFi module 223, a BT module 225, a GPS module 227, an NFC module 228, and an RF (Radio Frequency) module 229.

The cellular module 221 may offer a voice call, a video call, a message service, an internet service, or the like through a communication network (e.g., LTE, LTE-A, CDMA, WCDMA, UMTS, WiBro, or GSM, etc.). Additionally, the cellular module 221 may perform identification and authentication of the electronic device in the communication network, using the SIM card 224. According to an embodiment, the cellular module 221 may perform at least part of functions the AP 210 can provide. For example, the cellular module 221 may perform at least part of a multimedia control function.

According to an embodiment, the cellular module 221 may include a communication processor (CP). Additionally, the cellular module 221 may be formed of SoC, for example. Although some elements such as the cellular module 221 (e.g., the CP), the memory 230, or the power management module 295 are shown as separate elements being different from the AP 210 in FIG. 2, the AP 210 may be formed to have at least part (e.g., the cellular module 221) of the above elements in an embodiment.

According to an embodiment, the AP 210 or the cellular module 221 (e.g., the CP) may load commands or data, received from a nonvolatile memory connected thereto or from at least one of the other elements, into a volatile memory to process them. Additionally, the AP 210 or the cellular module 221 may store data, received from or created at one or more of the other elements, in the nonvolatile memory.

Each of the WiFi module 223, the BT module 225, the GPS module 227 and the NFC module 228 may include a processor for processing data transmitted or received therethrough. Although FIG. 2 shows the cellular module 221, the WiFi module 223, the BT module 225, the GPS module 227 and the NFC module 228 as different blocks, at least part of them may be contained in a single IC (Integrated Circuit) chip or a single IC package in an embodiment. For example, at least part (e.g., the CP corresponding to the cellular module 221 and a WiFi processor corresponding to the WiFi module 223) of respective processors corresponding to the cellular module 221, the WiFi module 223, the BT module 225, the GPS module 227 and the NFC module 228 may be formed as a single SoC.

The RF module 229 may transmit and receive data, e.g., RF signals or any other electric signals. Although not shown, the RF module 229 may include a transceiver, a PAM (Power Amp Module), a frequency filter, an LNA (Low Noise Amplifier), or the like. Also, the RF module 229 may include any component, e.g., a wire or a conductor, for transmission of electromagnetic waves in a free air space. Although FIG. 2 shows that the cellular module 221, the WiFi module 223, the BT module 225, the GPS module 227 and the NFC module 228 share the RF module 229, at least one of them may perform transmission and reception of RF signals through a separate RF module in an embodiment.

The SIM card 224_1 to 224_N may be a specific card formed of SIM and may be inserted into a slot 225_1 to 225_N formed at a certain place of the electronic device. The SIM card 224_1 to 224_N may contain therein an ICCID (Integrated Circuit Card IDentifier) or an IMSI (International Mobile Subscriber Identity).

The memory 230 (e.g., the memory 130) may include an internal memory 232 and/or an external memory 234. The internal memory 232 may include, for example, at least one of a volatile memory (e.g., DRAM (Dynamic RAM), SRAM (Static RAM), SDRAM (Synchronous DRAM), etc.) or a nonvolatile memory (e.g., OTPROM (One Time Programmable ROM), PROM (Programmable ROM), EPROM (Erasable and Programmable ROM), EEPROM (Electrically Erasable and Programmable ROM), mask ROM, flash ROM, NAND flash memory, NOR flash memory, etc.).

According to an embodiment, the internal memory 232 may have the form of an SSD (Solid State Drive). The external memory 234 may include a flash drive, e.g., CF (Compact Flash), SD (Secure Digital), Micro-SD (Micro Secure Digital), Mini-SD (Mini Secure Digital), xD (eXtreme Digital), memory stick, or the like. The external memory 234 may be functionally connected to the electronic device 200 through various interfaces. According to an embodiment, the electronic device 200 may further include a storage device or medium such as a hard drive.

The sensor module 240 may measure physical quantity or sense an operating status of the electronic device 200, and then convert measured or sensed information into electric signals. The sensor module 240 may include, for example, at least one of a gesture sensor 240A, a gyro sensor 240B, an atmospheric pressure sensor 240C, a magnetic sensor 240D, an acceleration sensor 240E, a grip sensor 240F, a proximity sensor 240G, a color sensor 240H (e.g., RGB (Red, Green, Blue) sensor), a biometric sensor 240I, a temperature-humidity sensor 240J, an illumination sensor 240K, and a UV (ultraviolet) sensor 240M. Additionally or alternatively, the sensor module 240 may include, e.g., an E-nose sensor (not shown), an EMG (electromyography) sensor (not shown), an EEG (electroencephalogram) sensor (not shown), an ECG (electrocardiogram) sensor (not shown), an IR (infrared) sensor (not shown), an iris scan sensor (not shown), or a finger scan sensor (not shown). Also, the sensor module 240 may include a control circuit for controlling one or more sensors equipped therein.

The input unit 250 may include various input circuitry, such as, for example, and without limitation, a touch panel 252, a digital pen sensor 254, a key 256, or an ultrasonic input unit 258. The touch panel 252 may recognize a touch input in a manner of capacitive type, resistive type, infrared type, or ultrasonic type. Also, the touch panel 252 may further include a control circuit. In case of a capacitive type, a physical contact or proximity may be recognized. The touch panel 252 may further include a tactile layer. In this case, the touch panel 252 may offer a tactile feedback to a user.

The digital pen sensor 254 may be formed in the same or similar manner as receiving a touch input or by using a separate recognition sheet. The key 256 may include, for example, a physical button, an optical key, or a keypad. The ultrasonic input unit 258 is a specific device capable of identifying data by sensing sound waves with a microphone 288 in the electronic device 200 through an input tool that generates ultrasonic signals, thus allowing wireless recognition. According to an embodiment, the electronic device 200 may receive a user input from any external device (e.g., a computer or a server) connected thereto through the communication module 220.

The display 260 (e.g., the display 150) may include a panel 262, a hologram 264, or a projector 266. The panel 262 may be, for example, LCD (Liquid Crystal Display), AM-OLED (Active Matrix Organic Light Emitting Diode), or the like. The panel 262 may have a flexible, transparent or wearable form. The panel 262 may be formed of a single module with the touch panel 252. The hologram 264 may show a stereoscopic image in the air using interference of light. The projector 266 may project an image onto a screen, which may be located at the inside or outside of the electronic device 200. According to an embodiment, the display 260 may further include a control circuit for controlling the panel 262, the hologram 264, and the projector 266.

The interface 270 may include various interface circuitry, such as, for example, and without limitation, an HDMI (High-Definition Multimedia Interface) 272, a USB (Universal Serial Bus) 274, an optical interface 276, or a D-sub (D-subminiature) 278. The interface 270 may be contained, for example, in the communication interface 160 shown in FIG. 1. Additionally or alternatively, the interface 270 may include, for example, an MHL (Mobile High-definition Link) interface, an SD (Secure Digital) card/MMC (Multi-Media Card) interface, or an IrDA (Infrared Data Association) interface.

The audio module 280 may perform a conversion between sounds and electric signals. At least part of the audio module 280 may be contained, for example, in the input/output interface 140 shown in FIG. 1. The audio module 280 may process sound information inputted or outputted through a speaker 282, a receiver 284, an earphone 286, or a microphone (e.g., mike) 288.

The camera module 291 is a device capable of obtaining still images and moving images. According to an embodiment, the camera module 291 may include at least one image sensor (e.g., a front sensor or a rear sensor), a lens (not shown), an ISP (Image Signal Processor, not shown), or a flash (e.g., LED or xenon lamp, not shown).

The power management module (PMM) 295 may manage electric power of the electronic device 200. Although not shown, the power management module 295 may include, for example, a PMIC (Power Management Integrated Circuit), a charger IC, or a battery or fuel gauge.

The PMIC may be formed, for example, of an IC chip or SoC. Charging may be performed in a wired or wireless manner. The charger IC may charge a battery 296 and prevent overvoltage or overcurrent from a charger. According to an embodiment, the charger IC may have a charger IC used for at least one of wired and wireless charging types. A wireless charging type may include, for example, a magnetic resonance type, a magnetic induction type, or an electromagnetic type. Any additional circuit for a wireless charging may be further used such as a coil loop, a resonance circuit, or a rectifier.

The battery gauge may measure the residual amount of the battery 296 and a voltage, current or temperature in a charging process. The battery 296 may store or create electric power therein and supply electric power to the electronic device 200. The battery 296 may be, for example, a rechargeable battery or a solar battery.

The indicator 297 may show thereon a current status (e.g., a booting status, a message status, or a recharging status) of the electronic device 200 or of its part (e.g., the AP 210). The motor 298 may convert an electric signal into a mechanical vibration. Although not shown, the electronic device 200 may include a specific processor (e.g., GPU) for supporting a mobile TV. This processor may process media data that comply with standards of DMB (Digital Multimedia Broadcasting), DVB (Digital Video Broadcasting), or media flow.

Each of the above-discussed elements of the electronic device disclosed herein may be formed of one or more components, and its name may be varied according to the type of the electronic device. The electronic device disclosed herein may be formed of at least one of the above-discussed elements without some elements or with additional other elements. Some of the elements may be integrated into a single entity that still performs the same functions as those of such elements before integrated.

The term "module" used in this disclosure may refer to a certain unit that includes one of hardware, software and firmware or any combination thereof. The module may be interchangeably used with unit, logic, logical block, component, or circuit, for example. The module may be the minimum unit, or part thereof, which performs one or more particular functions. The module may be formed mechanically or electronically. For example, the module disclosed herein may include at least one of a dedicated processor, a CPU, an ASIC (Application-Specific Integrated Circuit) chip, FPGAs (Field-Programmable Gate Arrays), and programmable-logic device, which have been known or are to be developed.

Figure 3:
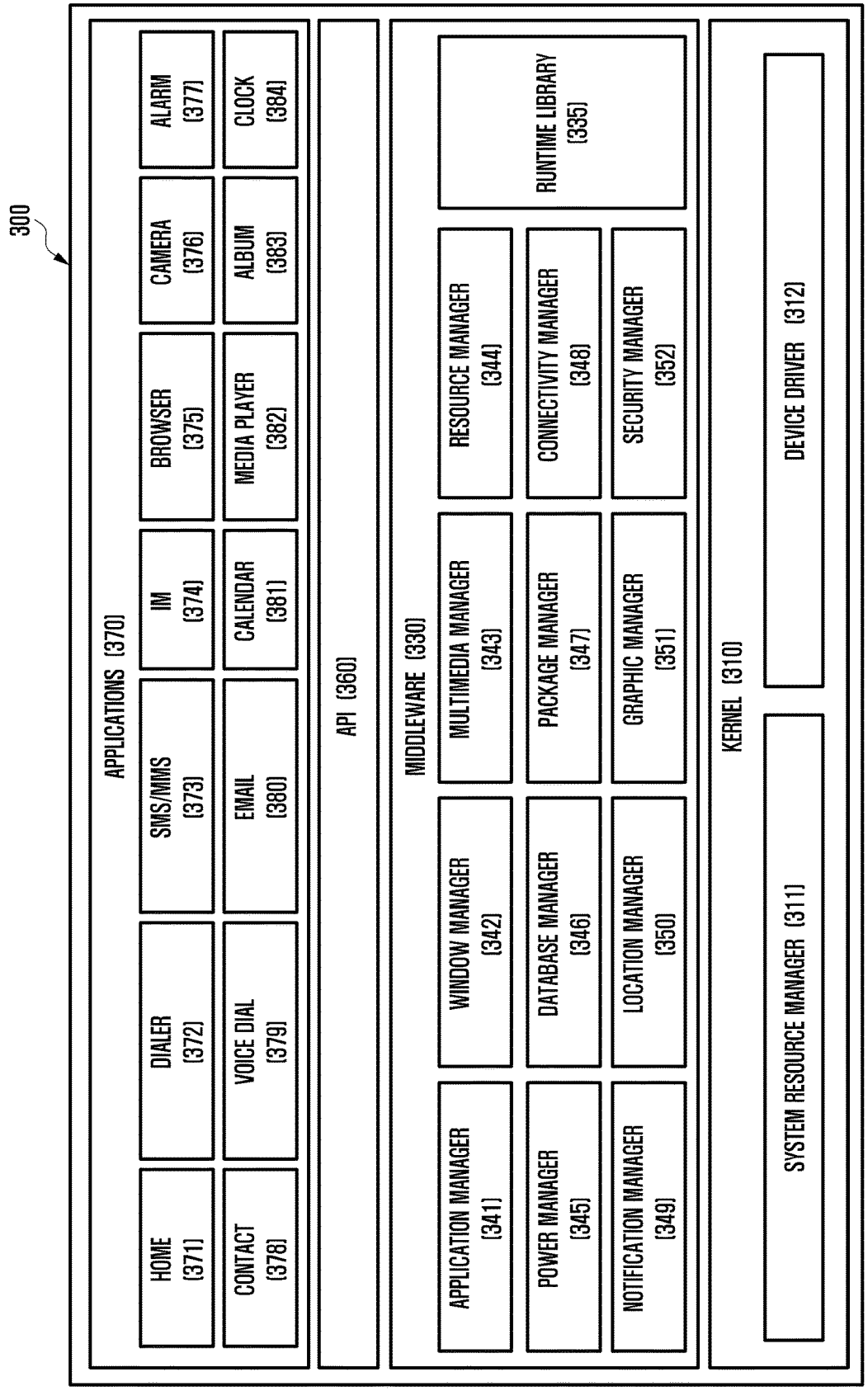
FIG. 3 is a block diagram illustrating an example program module according to various example embodiments of the present disclosure.

FIG. 3 is a block diagram illustrating an example configuration of a programming module 300 according to an example embodiment of the present disclosure.

The programming module 300 may be included (or stored) in the electronic device 100 (e.g., the memory 130) or may be included (or stored) in the electronic device 200 (e.g., the memory 230) illustrated in FIG. 1. At least a part of the programming module 300 may be implemented in software, firmware, hardware, or a combination of two or more thereof. The programming module 300 may be implemented in hardware (e.g., the hardware 200), and may include an OS controlling resources related to an electronic device (e.g., the electronic device 100) and/or various applications (e.g., an application 370) executed in the OS. For example, the OS may be Android, iOS, Windows, Symbian, Tizen, Bada, and the like.

Referring to FIG. 3, the programming module 300 may include a kernel 310, a middleware 330, an API 360, and/or the application 370.

The kernel 310 (e.g., the kernel 131) may include a system resource manager 311 and/or a device driver 312. The system resource manager 311 may include, for example, a process manager (not illustrated), a memory manager (not illustrated), and a file system manager (not illustrated). The system resource manager 311 may perform the control, allocation, recovery, and/or the like of system resources. The device driver 312 may include, for example, a display driver (not illustrated), a camera driver (not illustrated), a Bluetooth driver (not illustrated), a shared memory driver (not illustrated), a USB driver (not illustrated), a keypad driver (not illustrated), a Wi-Fi driver (not illustrated), and/or an audio driver (not illustrated). Also, according to an embodiment of the present disclosure, the device driver 312 may include an Inter-Process Communication (IPC) driver (not illustrated).

The middleware 330 may include multiple modules previously implemented to provide a function used in common by the applications 370. Also, the middleware 330 may provide a function to the applications 370 through the API 360 in order to enable the applications 370 to efficiently use limited system resources within the electronic device. For example, as illustrated in FIG. 3, the middleware 330 (e.g., the middleware 132) may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, a security manager 352, and any other suitable and/or similar manager.

The runtime library 335 may include, for example, a library module used by a complier, in order to add a new function by using a programming language during the execution of the application 370. According to an embodiment of the present disclosure, the runtime library 335 may perform functions which are related to input and output, the management of a memory, an arithmetic function, and/or the like.

The application manager 341 may manage, for example, a life cycle of at least one of the applications 370. The window manager 342 may manage GUI resources used on the screen. The multimedia manager 343 may detect a format used to reproduce various media files and may encode or decode a media file through a codec appropriate for the relevant format. The resource manager 344 may manage resources, such as a source code, a memory, a storage space, and/or the like of at least one of the applications 370.

The power manager 345 may operate together with a Basic Input/Output System (BIOS), may manage a battery or power, and may provide power information and the like used for an operation. The database manager 346 may manage a database in such a manner as to enable the generation, search and/or change of the database to be used by at least one of the applications 370. The package manager 347 may manage the installation and/or update of an application distributed in the form of a package file.

The connectivity manager 348 may manage a wireless connectivity such as, for example, Wi-Fi and Bluetooth. The notification manager 349 may display or report, to the user, an event such as an arrival message, an appointment, a proximity alarm, and the like in such a manner as not to disturb the user. The location manager 350 may manage location information of the electronic device. The graphic manager 351 may manage a graphic effect, which is to be provided to the user, and/or a user interface related to the graphic effect. The security manager 352 may provide various security functions used for system security, user authentication, and the like. According to an embodiment of the present disclosure, when the electronic device (e.g., the electronic device 100) has a telephone function, the middleware 330 may further include a telephony manager (not illustrated) for managing a voice telephony call function and/or a video telephony call function of the electronic device.

The middleware 330 may generate and use a new middleware module through various functional combinations of the above-described internal element modules. The middleware 330 may provide modules specialized according to types of OSs in order to provide differentiated functions. Also, the middleware 330 may dynamically delete some of the existing elements, or may add new elements. Accordingly, the middleware 330 may omit some of the elements described in the various embodiments of the present disclosure, may further include other elements, or may replace the some of the elements with elements, each of which performs a similar function and has a different name.

The API 360 (e.g., the API 133) is a set of API programming functions, and may be provided with a different configuration according to an OS. In the case of Android or iOS, for example, one API set may be provided to each platform. In the case of Tizen, for example, two or more API sets may be provided to each platform.

The applications 370 (e.g., the applications 134) may include, for example, a preloaded application and/or a third party application. The applications 370 (e.g., the applications 134) may include, for example, a home application 371, a dialer application 372, a Short Message Service (SMS)/Multimedia Message Service (MMS) application 373, an Instant Message (IM) application 374, a browser application 375, a camera application 376, an alarm application 377, a contact application 378, a voice dial application 379, an electronic mail (e-mail) application 380, a calendar application 381, a media player application 382, an album application 383, a clock application 384, and any other suitable and/or similar application.

At least a part of the programming module 300 may be implemented by instructions stored in a non-transitory computer-readable storage medium. When the instructions are executed by one or more processors (e.g., the one or more processors 210), the one or more processors may perform functions corresponding to the instructions. The non-transitory computer-readable storage medium may be, for example, the memory 220. At least a part of the programming module 300 may be implemented (e.g., executed) by, for example, the one or more processors 210. At least a part of the programming module 300 may include, for example, a module, a program, a routine, a set of instructions, and/or a process for performing one or more functions.

Figure 4:
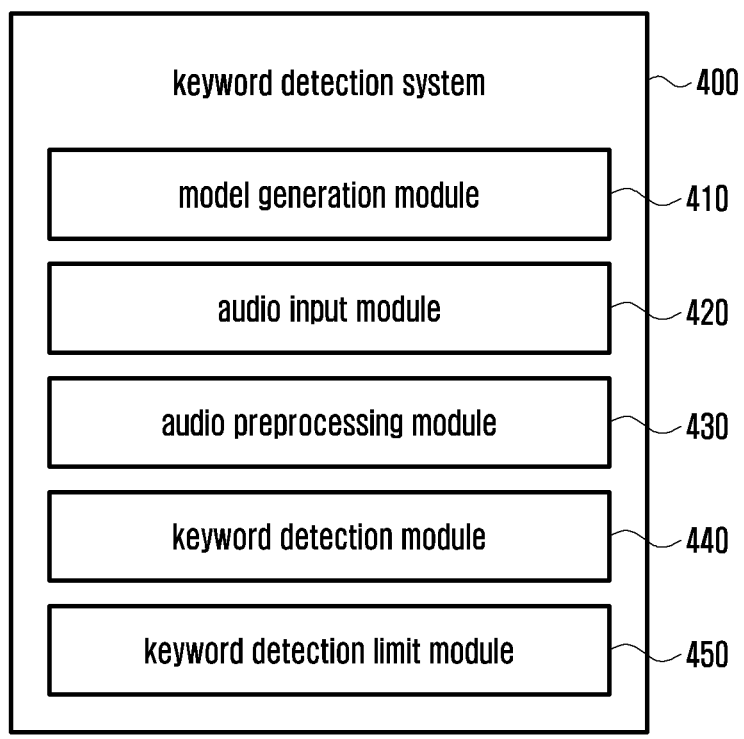
FIG. 4 is a block diagram schematically illustrating an example configuration of a keyword detection system according to various example embodiments of the present disclosure.

FIG. 4 is a block diagram illustrating an example configuration of a keyword detection system according to various example embodiments of the present disclosure.

Referring to FIG. 4, according to various embodiments of the present disclosure, an electronic device 101 may operate a keyword detection system 400. The keyword detection system 400 may detect at least one keyword that is included in a specific sound source (e.g., user's speech, music, TTS, or ARS), and execute a function that corresponds to the detected keyword. They keyword detection system 400 may be implemented using hardware, software, firmware or any combination thereof.

According to various embodiments of the present disclosure, the keyword detection system 400 may include a model generation module 410, an audio input module 420, an audio preprocessing module 430, a keyword detection module 440, and a keyword detection limit module 450. For example, the keyword detection limit module 450 may be unified with the keyword detection module 440 to operate as one keyword detection module. Each of the modules describe above may be implemented using hardware, software, firmware or any combination thereof.

According to various embodiments of the present disclosure, the model generation module 410 may extract a model parameter from a sound source that includes a specific keyword, and match the extracted model parameter with an initial model parameter. The model generation module 410 may repeatedly correct the model until an error becomes smaller than a threshold value through matching of the model parameter with the initial model parameter.

According to various embodiments of the present disclosure, the model generation module 410 may generate a speaker dependent model through extraction of the parameter only by the keyword spoken by a specific person, and generate a speaker independent model regardless of the speaker.

According to various embodiments of the present disclosure, the audio input module 420 receives audio data from the electronic device 101, and may include, for example, a microphone and a codec. The audio input module 420 may receive various kinds of sound sources, such as user's voice, noise around the electronic device, and sound that is output from the electronic device.

According to various embodiments of the present disclosure, the audio preprocessing module 430 may strengthen only user's speech voice from the audio data that is received from the audio input module 420, and suppress other audio data. For example, the audio preprocessing module 430 may include a noise suppressor (NS), an acoustic echo canceller (AEC), a dynamic range controller (DRC), and a gain.

According to various embodiments of the present disclosure, the keyword detection module 440 may extract parameters (features) from the input voice, and match the extracted parameter with a parameter that is extracted from a model that is generated from the model generation module 410. If an error becomes smaller than the threshold value as the result of the matching, the keyword detection module 440 may determine that the keyword detection has succeeded.

According to various embodiments of the present disclosure, if the keyword detection has succeeded, the keyword detection module 440 may execute a function that corresponds to the detected keyword. For example, the keyword detection module 440 may call a voice detection manager (e.g., S-Voice of Samsung or Siri of Apple) in accordance with the result of the keyword detection, or directly execute a specific function without calling the voice detection manager.

According to various embodiments of the present disclosure, the keyword detection limit module 450 may limit the keyword detection of the keyword detection module 440 to correspond to a predetermined condition. For example, an echo may be generated, which is caused by a sound source that is output through a speaker during performing of a call and then barges into the microphone. In order to remove the generated echo, an acoustic echo canceller (AEC) may be applied, but the AEC may distort even the keyword that is actually spoken by the user to cause the detection rate of the keyword to deteriorate. Accordingly, it may be difficult to graft the existing AEC on the voice detection function as it is. Hereinafter, referring to FIGS. 7 to 11, various scenarios for the electronic device 101 to limit the keyword detection are disclosed, and the keyword detection limit module 450 may perform at least one scenario disclosed in FIGS. 7 to 11.

According to various embodiments of the present disclosure, an electronic device includes a housing; a microphone located on a first portion of the housing or located near the first portion; a speaker located on a second portion of the housing or located near the second portion; a communication circuit; a processor electrically connected to the microphone, the speaker, and the communication circuit; and a memory electrically connected to the processor to at least temporarily store a message to be provided as a voice through the speaker, wherein the memory, when executed, stores instructions to cause the processor to determine time information that corresponds to a first part of the message if providing of the message is necessary, to output the message through the speaker, to receive an input sound through the microphone while at least a part of the message is output, and to process the input sound using the time information in order to detect at least one word or sentence from the input sound, and the instructions cause the processor to process the input sound by ignoring at least a part of the input sound using the time information.

The instructions may cause the processor to process the input sound by ignoring at least the part of the input sound in a section that includes at least one of before and after preprocessing.

The instructions may cause the processor to process the input sound by ignoring at least the part of the input sound using zero-padding before the preprocessing.

The instructions may cause the processor to process the input sound by ignoring at least the part of the input sound in a section that includes at least one of before and after voice detection.

The instructions may cause the processor to process the input sound by ignoring the word or sentence that corresponds to the time information after the voice detection.

The time information may include at least one of a start time, an end time, and a duration time of the word or sentence.

According to various embodiments of the present disclosure, an electronic device includes an output end; an input end; a keyword detection module; a processor electrically connected to the output end, the input end, and the keyword detection module; and a memory electrically connected to the processor, wherein the memory, when executed, stores instructions to cause the processor to analyze a sound source that is reproduced at the output end and to limit keyword detection at the input end to correspond to the analysis.

The instructions may cause the processor, in analyzing the sound source, to analyze a reproduction time of the keyword that is included in the sound source, and in limiting the keyword detection, to limit the keyword detection at the input end if the analyzed reproduction time of the keyword arrives.

The instructions may cause the processor, in analyzing the reproduction time of the keyword, to discriminate a changing phrase and a fixed phrase from a whole phrase of the sound source, to calculate a total reproduction time of the changing phrase, to calculate the reproduction time of the keyword that is included in the fixed phrase, and to calculate the reproduction time of the keyword within the whole phrase.

The sound source may be a TTS (Text To Speech).

The instructions may cause the processor, in analyzing the sound source, to detect the keyword that is included in the sound source, and in limiting the keyword detection, to limit the keyword detection at the input end if the keyword is detected at the output end.

The instructions may cause the processor, in analyzing the sound source, to detect the keyword that is included in the sound source, to mix a non-audible signal with the keyword at the output end, and in limiting the keyword detection, to limit the keyword detection at the input end if the non-audible signal is sensed at the input end.

The instructions may cause the processor to determine whether a user is making a speech, and in limiting the keyword detection, to limit the keyword detection at the input end through preprocessing if the sound source is not the user's speech.

The preprocessing may include at least one of muting and white noise processing.

The instructions may cause the processor to set preprocessing for minimizing distortion of the user's speech if the sound source is reproduced at the output end during a user's speech.

The instructions may cause the processor to set preprocessing not using the AEC so that the user's speech has no distortion if the sound source is not reproduced at the output end during a user's speech.

Figure 5:
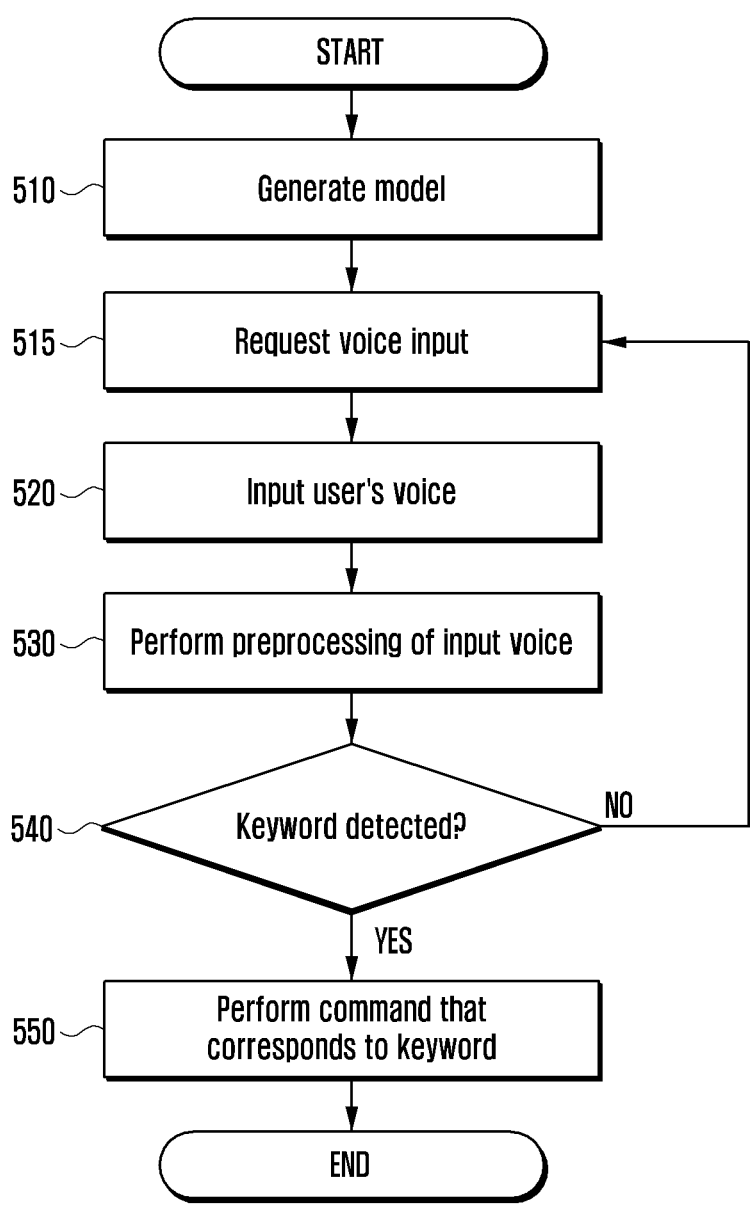
FIG. 5 is a flowchart illustrating an example method for performing keyword detection according to various example embodiments of the present disclosure.

FIG. 5 is a flowchart illustrating an example method for performing keyword detection according to various example embodiments of the present disclosure.

Referring to FIG. 5, according to various embodiments of the present disclosure, at operation 510, the electronic device 101 may generate a model for keyword detection.

According to various embodiments of the present disclosure, at operation 510, the electronic device 101 may extract a model parameter from a sound source that includes a specific keyword, and match the extracted model parameter with an initial model parameter. The electronic device 101 may repeatedly correct the model until an error becomes smaller than a threshold value through matching of the model parameter with the initial model parameter.

According to various embodiments of the present disclosure, at operation 510, the electronic device 101 may generate a speaker dependent model through extraction of the parameter only by the keyword spoken by a specific person, or generate a speaker independent model regardless of the speaker.

According to various embodiments of the present disclosure, the electronic device 101 may omit a model generation operation 510 for keyword detection, and receive a pre-generated model from an external electronic device. Accordingly, operations 510 and 520 in the electronic device 101 may have a large gap in time.

According to various embodiments of the present disclosure, at operation 515, the electronic device 101 may request a user to input a voice. For example, at operation 515, the electronic device 101 may output a text, an image, or sound for requesting voice input.

According to various embodiments of the present disclosure, at operation 520, the electronic device 101 may receive a voice input from a user. That is, the electronic device 101 may receive the user's voice.

According to various embodiments of the present disclosure, the electronic device 101 may include a microphone and a codec. At operation 520, the electronic device 101 may receive various kinds of sound sources, such as user's voice, noise around the electronic device, and sound that is output from the electronic device.

According to various embodiments of the present disclosure, the electronic device 101 may strengthen only user's speech voice from the received audio data, and suppress other audio data. For example, the electronic device 101 may include a noise suppressor (NS), an acoustic echo canceller (AEC), a dynamic range controller (DRC), and a gain.

According to various embodiments of the present disclosure, at operation 540, the electronic device 101 may extract parameters (features) from the input voice, and match the extracted parameter with a parameter that is extracted from a model that is generated at operation 510. If an error becomes smaller than the threshold value as the result of the parameter matching, the electronic device 101, at operation 540, may determine that the keyword detection has succeeded.

According to various embodiments of the present disclosure, at operation 550, the electronic device 101 may perform a command that corresponds to the detected keyword. For example, the electronic device 101 may call a voice detection manager (e.g., S-Voice of Samsung or Siri of Apple) in accordance with the result of the keyword detection, or directly execute a specific function without calling the voice detection manager.

Figure 6:
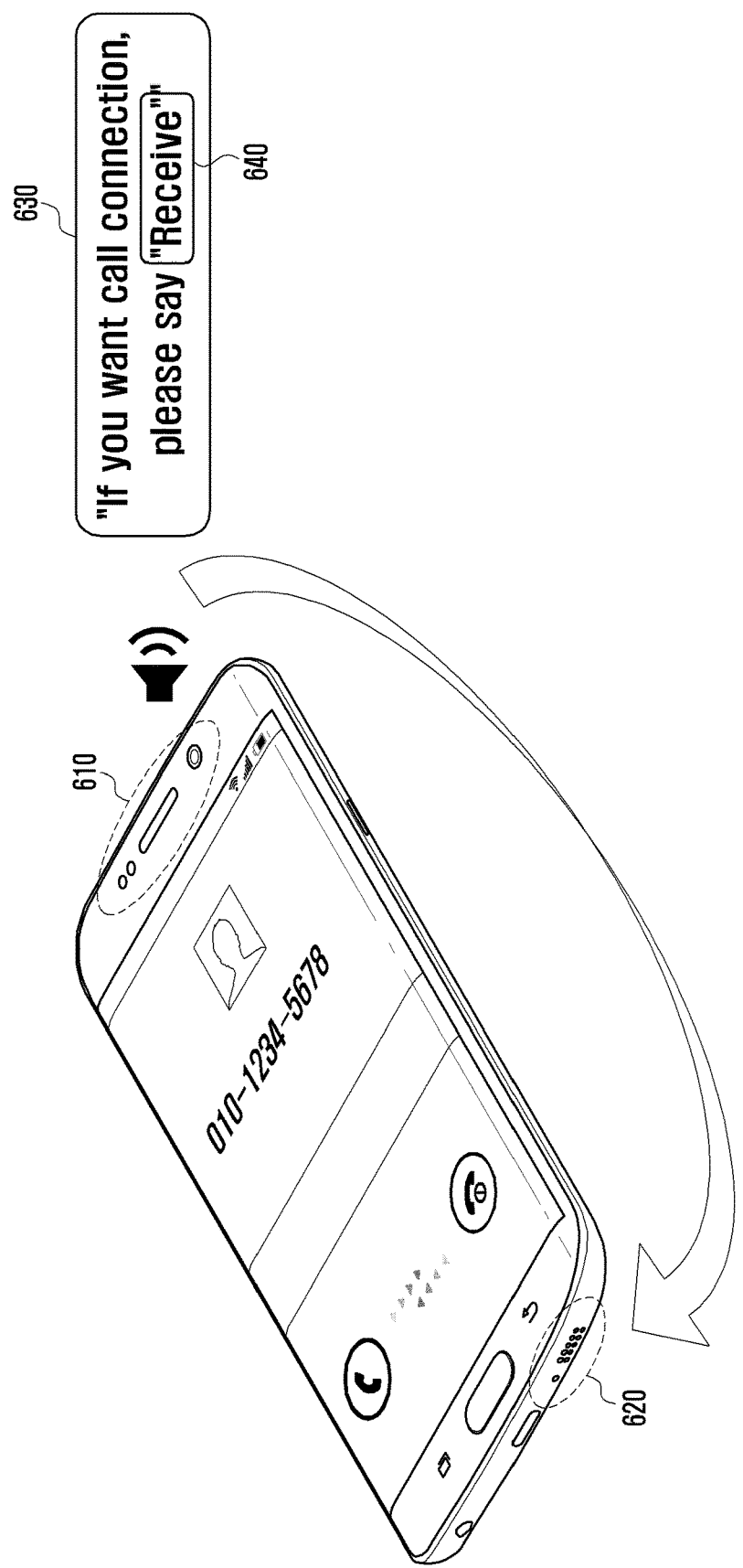
FIG. 6 is a diagram illustrating a situation in which malfunction of keyword detection occurs due to an echo in an electronic device according to various example embodiments of the present disclosure.

FIG. 6 is a diagram schematically illustrating an example situation in which malfunction of keyword detection occurs due to an echo generated in an electronic device according to various example embodiments of the present disclosure.

Referring to FIG. 6, a sound source (e.g., ring back tone) 630 that is generated from an output end (e.g., speaker) 610 of the electronic device 101 may interfere with an input end (e.g., microphone) 620 of the electronic device 101.

According to various embodiments of the present disclosure, if a keyword 640 to be detected is included in the sound source that is output from the speaker 610 of the electronic device 101, the keyword 640 may be input through the microphone 620 even if a user has not spoken the keyword 640. The electronic device 101 may perform an operation that is not intended by the user (e.g., although the user does not want a call connection, a call may be connected due to "Receive" 640) due to the wrongly input keyword 640. Here, the keyword that is output through the speaker 610 may include various sound sources that are generated through music, recorded voice, ARS, or TTS technology.

For reference, an echo phenomenon, which is caused by a sound source that is output through a speaker and then is input again to the microphone, is frequently generated in the existing voice calls, and in order to solve this problem, AEC technology has been devised and used. For example, the AEC can remove the echo signal included in the signal that is input to the input end through the microphone using a reference signal that is just before the sound source reproduction at the output end.

According to various embodiments, the electronic device 101 can completely remove the sound source (e.g., echo) that is reproduced through the speaker using the AEC that has been used in the voice call, and thus misdetection of the keyword even in the case where the user does not make a speech can be prevented from occurring. However, if the user makes a keyword while the sound source is reproduced through the speaker, the keyword that is spoken by the user may be distorted in the process of removing the echo, and this may cause the whole keyword detection performance to deteriorate. Accordingly, it may be difficult to graft the existing AEC on the voice detection function as it is. Hereinafter, referring to FIGS. 7 to 11, the electronic device 101 may perform various scenarios to prevent the deterioration of the keyword detection performance.

Figure 7:
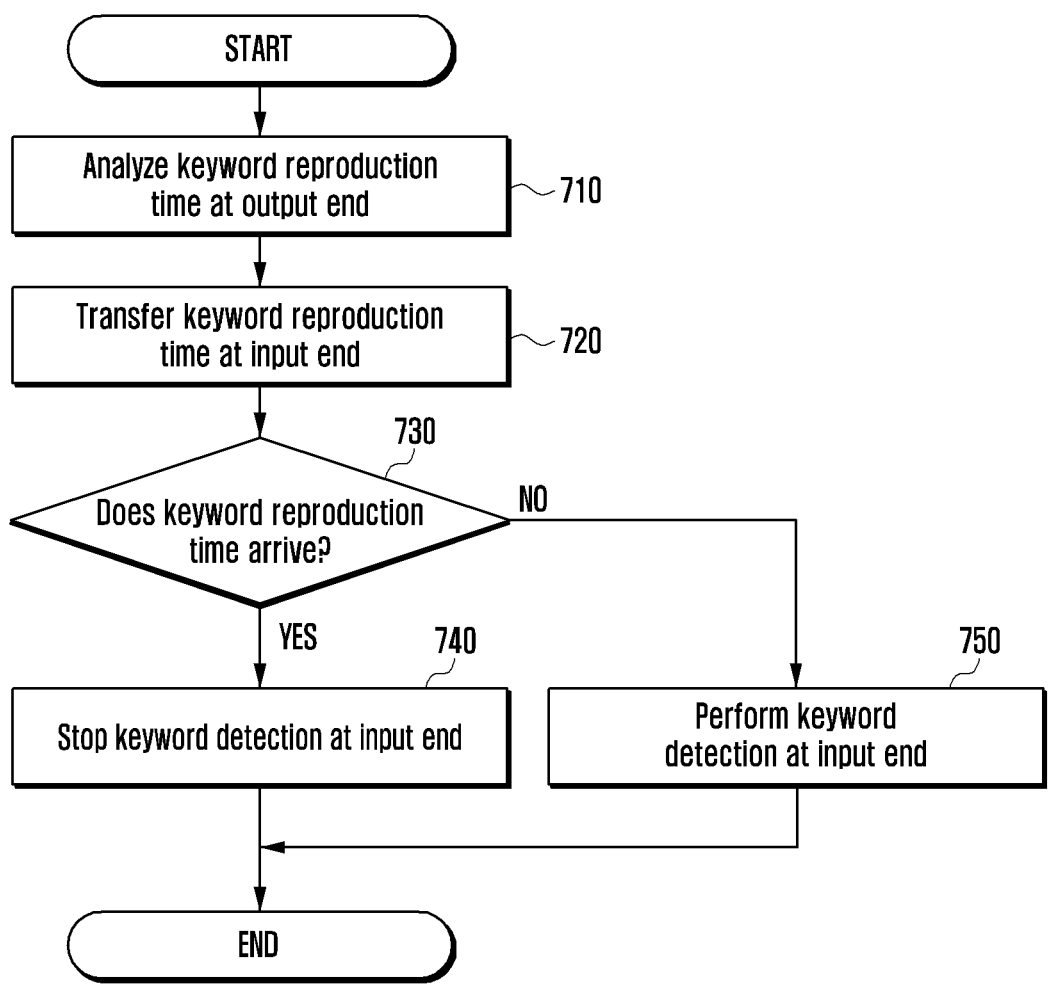
FIG. 7 is a flowchart illustrating an example method for limiting keyword detection through analysis of a keyword reproduction time of an electronic device according to various example embodiments of the present disclosure.

FIG. 7 is a flowchart illustrating an example method for limiting keyword detection through analysis of a keyword reproduction time of an electronic device according to various example embodiments of the present disclosure.

Referring to FIG. 7, according to various embodiments of the present disclosure, at operation 710, the electronic device 101 may analyze a keyword reproduction time at the output end. That is, the electronic device 101 may analyze a section of the sound source being reproduced, in which a keyword to be detected is included, and use the analyzed section in limiting the keyword detection in the corresponding section. The detailed analysis method will be described with reference to FIG. 8.

According to various embodiments of the present disclosure, at operation 720, the electronic device 101 may transfer information on the keyword reproduction time that is analyzed at operation 710 to the input end.

According to various embodiments of the present disclosure, at operation 730, the electronic device 101 may determined whether the keyword reproduction time has arrived.

According to various embodiments of the present disclosure, if the keyword reproduction time has arrived, the electronic device 101 may branch to operation 740 to stop the keyword detection at the input end. That is, if the corresponding reproduction time has arrived, the electronic device 101 may intercept the keyword detection itself based on the analyzed reproduction time. In order to prevent the malfunction in the voice detection, the electronic device 101 may stop the voice detection itself at the corresponding keyword reproduction time.

According to various embodiments of the present disclosure, if the keyword reproduction time has not arrived, the electronic device 101 may branch to operation 750 to continue the keyword detection at the input end.

Figure 8:
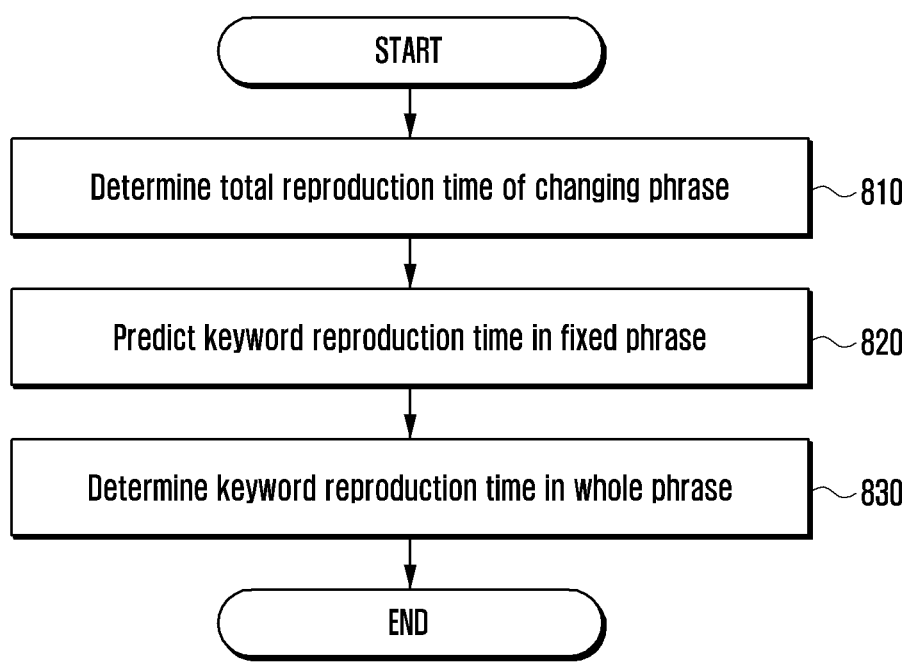
FIG. 8 is a flowchart illustrating an example method for analyzing a keyword reproduction time of an electronic device according to various example embodiments of the present disclosure.

FIG. 8 is a flowchart illustrating an example method for analyzing a keyword reproduction time of an electronic device according to various example embodiments of the present disclosure.

Referring to FIG. 8, a method for analyzing the keyword reproduction time of an electronic device 101 is disclosed to explain operation 710 of FIG. 7 in greater detail.

According to various embodiments of the present disclosure, it may be assumed that the whole phrase is a TTS sound source that is reproduced at the output end. For example, the whole phrase may be "There's a call for Hong Gil-dong. If you want a call connection, please say "Receive"." In this case, a changing phrase may be "There's a call for Hong Gil-dong", which may be changed in accordance with a calling party. The remainder "If you want a call connection, please say "Receive"" of the whole phrase may be a fixed phrase, which is not changed in accordance with the calling party. Here, the term "Receive" may be detected as the keyword 640.

According to various embodiments of the present disclosure, the electronic device 101, at operation 810, may determine the reproduction time of the changing phrase in the whole phrase. For example, the electronic device 101 may determine the reproduction time of "There's a call for Hong Gil-dong". The electronic device 101 may consider the duration and the speech rate for each phoneme based on the set speaker and language information, and thus can predict the reproduction time of the keyword 640 in the fixed phrase.

According to various embodiments of the present disclosure, the electronic device 101, at operation 830, may determine the keyword reproduction time in the whole phrase. For example, the electronic device 101 may determine the keyword reproduction time in the whole phrase in consideration of the reproduction time of the changing phrase that is calculated at operation 810 and the reproduction time of the keyword 640 that is predicted at operation 820.

According to various embodiments of the present disclosure, if it is predicted that the word "Receive" is reproduced between 10.5 sec and 11.6 sec (e.g., start and end of "Receive"), the electronic device 101 may ignore the word "Receive" in the corresponding section. For example, if the user says "Receive" simultaneously with a guide sound (e.g., TTS), the processing (e.g., canceling) is performed as if the "Receive" spoken by the user was not input. Of course, the electronic device 101 may process as if even the "Receive" of the guide sound (e.g., TTS) was not input.

According to various embodiments of the present disclosure, if the "Receive" spoken by the user is even slightly steps outside the prediction time (e.g., 11.0 sec to 12.5 sec), the electronic device 101 may process as if the "Receive" spoken by the user was input.

Figure 9:
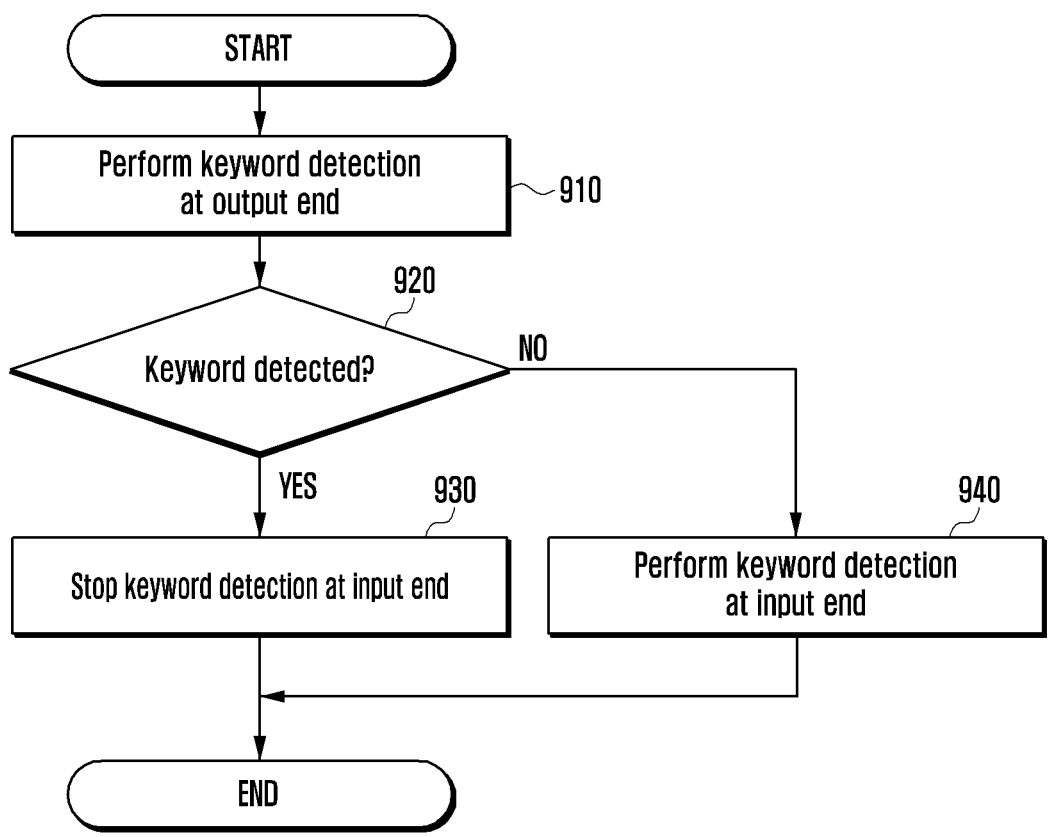
FIG. 9 is a flowchart illustrating an example method for limiting keyword detection at an input end in accordance with keyword detection at an output end of an electronic device according to various example embodiments of the present disclosure.

FIG. 9 is a flowchart illustrating an example method for limiting keyword detection at an input end in accordance with keyword detection at an output end of an electronic device according to various example embodiments of the present disclosure.

Referring to FIG. 9, according to various embodiments of the present disclosure, the electronic device 101, at operation 910, may perform keyword detection in advance before reproducing a sound source through a speaker at an output end.

According to various embodiments of the present disclosure, the electronic device 101, at operation 920, may confirm whether the keyword is detected at the output end.

According to various embodiments of the present disclosure, if the keyword is detected at the output end, the electronic device 101 may branch to operation 930, and stop the keyword detection at the input end in a section that is adjacent to a section in which the keyword is detected. That is, if the target keyword is pre-detected at the output end, the electronic device 101 may intercept the keyword detection itself.

According to various embodiments of the present disclosure, if the keyword is no detected at the output end, the electronic device 101 may branch to operation 940, and continue the keyword detection at the input end.

Figure 10:
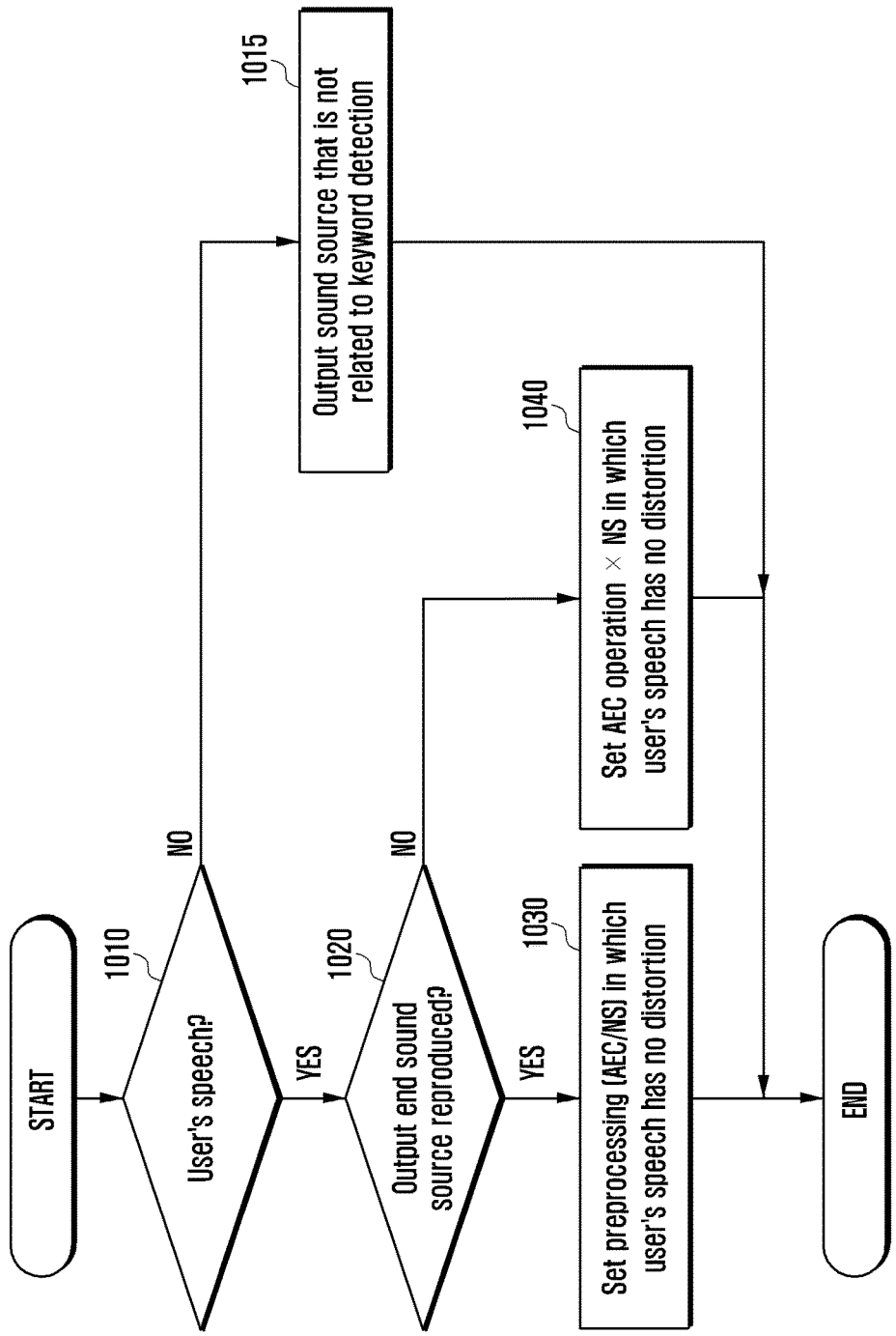
FIG. 10 is a flowchart illustrating an example method for performing preprocessing of voice detection in accordance with user's speech of an electronic device or sound source reproduction according to various example embodiments of the present disclosure.

FIG. 10 is a flowchart illustrating an example method of performing preprocessing of voice detection in accordance with user's speech of an electronic device or sound source reproduction according to various example embodiments of the present disclosure.

According to various embodiments of the present disclosure, the electronic device 101, at operation 1010, may determine whether a user is making a speech. For example, the electronic device 101 may determine existence/nonexistence of the user's speech using voice activity detection (VAD) for determining whether the user is making a speech at the input end of the electronic device 101.

According to various embodiments of the present disclosure, if the user is not making a speech, the electronic device 101 may branch to operation 1015 to perform processing so that a sound source that is not related to the keyword detection is output. That is, the electronic device 101 may preprocess the sound source that is received at the input end, and perform processing as if a sound source that was not related to the keyword detection (e.g., mute or white noise) was output. Through this, the electronic device 101 may prevent malfunction of the keyword detection that may occur when the user is not making a speech.

According to various embodiments of the present disclosure, if the user is making a speech, the electronic device 101 may branch to operation 1020 to confirm whether the sound source is being reproduced at the output end.

According to various embodiments of the present disclosure, if the sound source is not being reproduced at the output end, the electronic device 101 may branch to operation 1040 to set an NS in which the user's speech is not distorted without operating an AEC. That is, nonexistence of the sound source being reproduced at the output end may refer, for example, to a situation in which an echo is not generated, and the electronic device 101 may not operate the AEC through a preprocessing unit of the input end. Accordingly, the electronic device 101 may prevent deterioration of the keyword detection that may occur through the AEC.

According to various embodiments of the present disclosure, if the sound source is being reproduced at the output end, the electronic device 101 may branch to operation 1030 and set the audio preprocessing module to minimize the distortion of the user's speech. In this case, the electronic device 101 may unavoidably set the audio preprocessing module so that the AEC and the NS operate. For example, the AEC may be composed of an adaptive filter (ADF) for removing a linear echo component and a post-processing module for removing a non-linear echo component. An excessive use of the post-processing module can effectively remove the non-linear echo component, but may cause distortion of user's speech voice to occur. Accordingly, even if the remaining echo is generated, the electronic device 101 can minimize the distortion of the user's speech through maximum self-control of the use of the post-processing module of the AEC.

Figure 11:
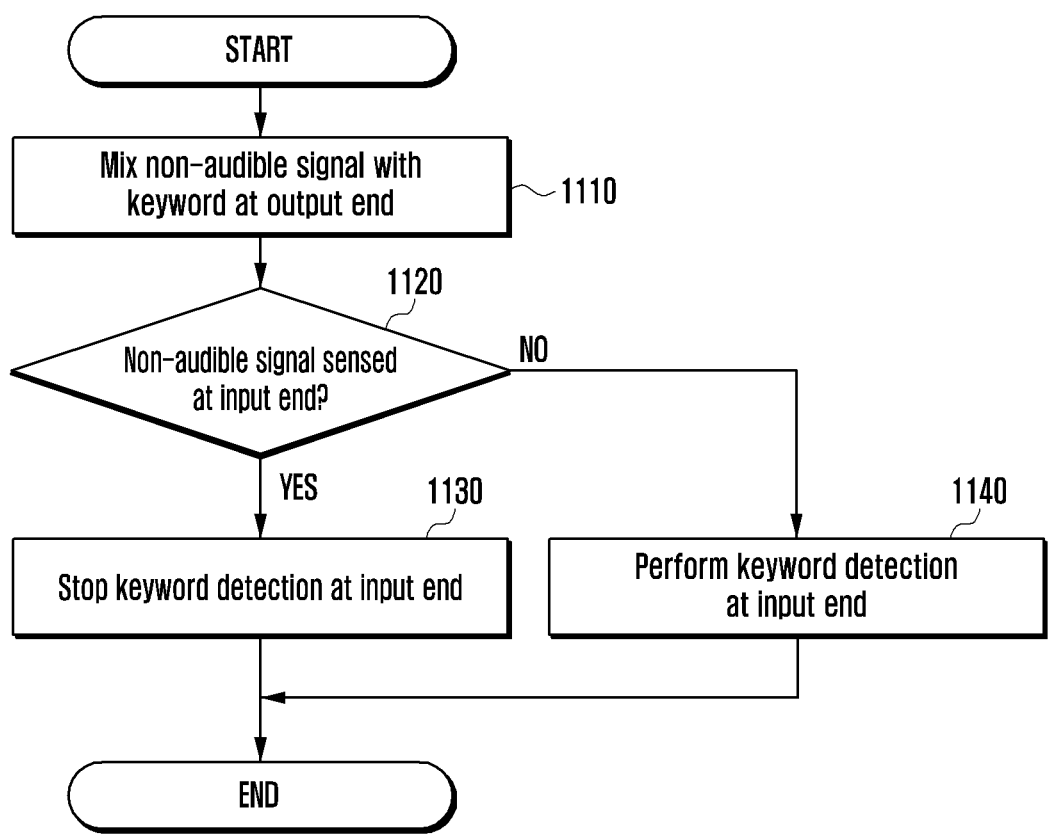
FIG. 11 is a flowchart illustrating an example method for limiting keyword detection using a non-audible signal of an electronic device according to various example embodiments of the present disclosure.

FIG. 11 is a flowchart illustrating an example method for limiting keyword detection using a non-audible signal of an electronic device according to various example embodiments of the present disclosure.

Referring to FIG. 11, according to various embodiments of the present disclosure, the electronic device 101, at operation 1110, may mix a non-audible signal with a keyword at the output end. For example, the electronic device 101 may mix a frequency band signal that a person is unable to hear (non-audible signal) with the keyword that is included in a sound source that is reproduced at the output end. In general, since the human audible frequency is known as 20 to 20000 Hz, the electronic device 101 may mix the frequency signals that are not included in the corresponding range.

According to various embodiments of the present disclosure, the electronic device 101, at operation 1120, may confirm whether the mixed non-audible signal is sensed at the input end at operation 1110.

According to various embodiments of the present disclosure, if the non-audible signal is sensed at the input end, the electronic device 101 may branch to operation 1130 and stop the keyword detection at the input end in a section in which the non-audible signal is detected and an adjacent section. That is, if the non-audible signal that is mixed at the output end is sensed at the input end, the electronic device 101 may intercept the keyword detection itself at the input end in the corresponding section.

According to various embodiments of the present disclosure, if the non-audible signal is not sensed at the input end, the electronic device 101 branches to operation 1140 to continue the keyword detection at the input end.

According to various embodiments, a method for processing an input sound of an electronic device includes at least temporarily storing a message to be provided as a voice through a speaker; determining time information that corresponds to a first part of the message if providing of the message is necessary; outputting the message through the speaker; receiving an input sound through a microphone while at least a part of the message is output; and processing the input sound using the time information in order to detect at least one word or sentence from the input sound, wherein the processing the input sound includes processing the input sound by ignoring at least a part of the input sound using the time information.

The processing the input sound may include processing the input sound by ignoring at least the part of the input sound in a section that includes at least one of before and after preprocessing.

The processing the input sound may include processing the input sound by ignoring at least the part of the input sound using zero-padding before the preprocessing.

The processing the input sound may include processing the input sound by ignoring at least the part of the input sound in a section that includes at least one of before and after voice detection.

The processing the input sound may include processing the input sound by ignoring the word or sentence that corresponds to the time information after the voice detection.

The time information may include at least one of a start time, an end time, and a duration time of the word or sentence.

The method according to the various embodiments of the present disclosure may further include analyzing a sound source that is reproduced at the output end; and limiting keyword detection at the input end to correspond to the analysis.

The analyzing the sound source may include analyzing a reproduction time of the keyword that is included in the sound source, and the limiting the keyword detection may include limiting the keyword detection at the input end if the analyzed reproduction time of the keyword arrives.

The analyzing the reproduction time of the keyword may include discriminating a changing phrase and a fixed phrase from a whole phrase of the sound source; calculating a total reproduction time of the changing phrase; calculating the reproduction time of the keyword that is included in the fixed phrase; and calculating the reproduction time of the keyword within the whole phrase.

The sound source may be a TTS (Text To Speech).

The analyzing the sound source may include detecting the keyword that is included in the sound source, and the limiting the keyword detection may include limiting the keyword detection at the input end if the keyword is detected at the output end.

The analyzing the sound source may include detecting the keyword that is included in the sound source; and mixing a non-audible signal with the keyword at the output end, and the limiting the keyword detection may include limiting the keyword detection at the input end if the non-audible signal is sensed at the input end.

The method according to the various embodiments of the present disclosure may further include determining whether a user is making a speech, and the limiting the keyword detection may include limiting the keyword detection at the input end through preprocessing if the sound source is not the user's speech.

The preprocessing may include at least one of muting and white noise processing.

The method according to the various embodiments of the present disclosure may further include setting preprocessing for minimizing distortion of the user's speech if the sound source is reproduced at the output end during a user's speech.

The method according to the various embodiments of the present disclosure may further include setting preprocessing for minimizing distortion of the user's speech if the sound source is not reproduced at the output end during a user's speech.

The term "module" used in the present disclosure may refer to, for example, a unit including one or more combinations of hardware, software, and firmware. The "module" may be interchangeable with a term, such as "unit," "logic," "logical block," "component," "circuit," or the like. The "module" may be a minimum unit of a component formed as one body or a part thereof. The "module" may be a minimum unit for performing one or more functions or a part thereof. The "module" may be implemented mechanically or electronically. For example, the "module" according to an embodiment of the present disclosure may include at least one of a dedicated processor, a CPU, an Application-Specific Integrated Circuit (ASIC) chip, a Field-Programmable Gate Array (FPGA), and a programmable-logic device for performing certain operations which have been known or are to be developed in the future.

Examples of computer-readable media include: magnetic media, such as hard disks, floppy disks, and magnetic tape; optical media such as Compact Disc Read Only Memory (CD-ROM) disks and Digital Versatile Disc (DVD); magneto-optical media, such as floptical disks; and hardware devices that are specially configured to store and perform program instructions (e.g., programming modules), such as read-only memory (ROM), random access memory (RAM), flash memory, etc. Examples of program instructions include machine code instructions created by assembly languages, such as a compiler, and code instructions created by a high-level programming language executable in computers using an interpreter, etc. The described hardware devices may be configured to act as one or more software modules in order to perform the operations and methods described above, or vice versa.

Modules or programming modules according to the embodiments of the present disclosure may include one or more components, remove part of them described above, or include new components. The operations performed by modules, programming modules, or the other components, according to the present disclosure, may be executed in serial, parallel, repetitive or heuristic fashion. Part of the operations can be executed in any other order, skipped, or executed with additional operations.

Although various example embodiments of the disclosure have been described in detail above, it should be understood that many variations and modifications of the disclosure, which may be apparent to those skilled in the art, will still fall within the spirit and scope of the disclosure as defined in the appended claims.

What is claimed is:

1. An electronic device comprising:
   a housing;
   a microphone disposed in or within a predetermined distance of a first portion of the housing;
   a speaker disposed in or within a predetermined distance of a second portion of the housing;
   a communication circuit;
   a processor electrically connected to the microphone, the speaker, and the communication circuit; and
   a memory electrically connected to the processor and wherein the memory is configured to store a message to be provided as a voice through the speaker,
   wherein the processor is configured to execute instructions stored in the memory to perform operations comprising:

determining time information corresponding to a first part of the message if providing of the message is necessary, outputting the message through the speaker, receiving an input sound through the microphone while at least a part of the message is output, and processing the input sound using the time information to detect at least one word or sentence from the input sound, wherein processing the input sound includes ignoring at least a part of the input sound using the time information, and wherein the time information comprises a reproduction time of the first part of the message.

2. The electronic device of claim 1, wherein the processing includes processing the input sound by ignoring at least the part of the input sound in a section that includes at least one of before or after preprocessing.

3. The electronic device of claim 2, wherein the processing includes processing the input sound by ignoring at least the part of the input sound using zero-padding before the preprocessing.

4. The electronic device of claim 1, wherein the processing includes processing the input sound by ignoring at least the part of the input sound in a section that includes at least one of before or after voice detection.

5. The electronic device of claim 4, wherein the processing includes processing the input sound by ignoring the word or sentence that corresponds to the time information after the voice detection.

6. The electronic device of claim 1, wherein the time information comprises at least one of: a start time, an end time, or a duration time of the word or sentence.

7. A method for processing an input sound of an electronic device, comprising:

storing a message to be provided as a voice through a speaker;

determining time information corresponding to a first part of the message if providing of the message is necessary;

outputting the message through the speaker;

receiving an input sound through a microphone while at least a part of the message is output; and processing the input sound using the time information in order to detect at least one word or sentence from the input sound, wherein the processing the input sound includes processing the input sound by ignoring at least a part of the input sound using the time information, and wherein the time information comprises a reproduction time of the first part of the message.

8. The method of claim 7, wherein the processing the input sound comprises processing the input sound by ignoring at least the part of the input sound in a section that includes at least one of before or after preprocessing.

9. The method of claim 8, wherein the processing the input sound comprises processing the input sound by ignoring at least the part of the input sound using zero-padding before the preprocessing.

10. The method of claim 7, wherein the processing the input sound comprises processing the input sound by ignoring at least the part of the input sound in a section that includes at least one of before or after voice detection.

11. The method of claim 10, wherein the processing the input sound comprises processing the input sound by ignoring the word or sentence that corresponds to the time information after the voice detection.

12. The method of claim 7, wherein the time information comprises at least one of: a start time, an end time, or a duration time of the word or sentence.

13. An electronic device comprising:

an output disposed at one end of the electronic device;

an input disposed at another end of the electronic device;

a keyword detection module comprising keyword detection circuitry;

a processor electrically connected to the output, the input, and the keyword detection module; and a memory electrically connected to the processor, wherein the processor is configured to execute instructions stored in the memory to perform operations comprising:

analyzing a sound source that is reproduced at the output, and limiting keyword detection at the input to correspond to the analysis, wherein the analyzing includes analyzing a reproduction time of a keyword that is included in the sound source, and the limiting the keyword detection includes limiting the keyword detection at the input if the analyzed reproduction time of the keyword arrives.

14. The electronic device of claim 13, wherein analyzing the reproduction time of the keyword includes discriminating a changing phrase and a fixed phrase from a whole phrase of the sound source, and the operations further comprise:

determining a total reproduction time of the changing phrase, determining the reproduction time of the keyword that is included in the fixed phrase, and determining the reproduction time of the keyword within the whole phrase.

15. The electronic device of claim 13, wherein analyzing the sound source includes detecting the keyword that is included in the sound source, and limiting the keyword detection includes limiting the keyword detection at the input if the keyword is detected at the output.

16. The electronic device of claim 13, wherein analyzing the sound source includes detecting the keyword that is included in the sound source, and the operations further comprise:

mixing a non-audible signal with the keyword at the output, and limiting the keyword detection includes limiting the keyword detection at the input if the non-audible signal is sensed at the input end.

17. The electronic device of claim 13, wherein the operations further comprise determining whether speech is made, and limiting the keyword detection includes limiting the keyword detection at the input through preprocessing if the sound source is not speech.

18. The electronic device of claim 13, wherein the operations further comprise: setting preprocessing for reducing distortion of speech if the sound source is reproduced at the output during speech.

19. The electronic device of claim 13, wherein the operations further comprise: setting preprocessing to not use acoustic echo cancelling circuitry so that speech has no distortion if the sound source is not reproduced at the output during speech.

* * * * *